(12) United States Patent
Han

(10) Patent No.: US 7,075,522 B2
(45) Date of Patent: Jul. 11, 2006

(54) TOUCH PANEL STRUCTURE FOR INCREASING ACTIVE AREA

(75) Inventor: Jae Heung Han, Kyunggi-do (KR)

(73) Assignee: Inotouch Technology Co., Ltd., Kyunggi-do (KR)

( * ) Notice: Subject to any disclaimer, the term of this patent is extended or adjusted under 35 U.S.C. 154(b) by 311 days.

(21) Appl. No.: 10/379,693

(22) Filed: Mar. 6, 2003

(65) Prior Publication Data

US 2003/0184527 A1    Oct. 2, 2003

(30) Foreign Application Priority Data

Mar. 27, 2002  (KR) ................... 10-2002-0016608

(51) Int. Cl.
*G09G 5/00*    (2006.01)
(52) U.S. Cl. .................. 345/173; 345/157; 178/18.05; 178/19.01
(58) Field of Classification Search ................ 345/173, 345/156–157, 174; 178/18.01, 18.03, 18.05, 178/19.01, 19.04
See application file for complete search history.

(56) References Cited

U.S. PATENT DOCUMENTS 4,822,957 A    4/1989    Talmage, Jr. et al. ......... 178/18
6,549,193 B1 *  4/2003   Huang et al. ................ 345/173
6,593,916 B1 *  7/2003   Aroyan ........................ 345/173

\* cited by examiner

*Primary Examiner*—Amr A. Awad
*Assistant Examiner*—Leonid Shapiro
(74) *Attorney, Agent, or Firm*—Bacon & Thomas, PLLC

(57) ABSTRACT

The present invention relates to a touch panel structure for increasing an active area of a touch panel. The touch panel structure comprises a resistive surface for constructing an inner portion of the panel taking the shape of a rectangle with four sides and four corners; a plurality of electrode segments arranged in a predetermined length and at a constant interval in the resistive surface adjacent to the four sides of the panel to be symmetric with each other disposed at corresponding positions; a plurality of compensation electrode segments arranged in a predetermined length and at a constant interval between the plurality of electrode segments and the sides of the panel to be symmetric with each other disposed at corresponding positions; and compensation patterns formed through connection of the electrode segments disposed at any side of the panel with the compensation electrode segments adjacent thereto. According to the present invention, it is possible to minimize the voltage gradient or voltage drop generated from the corners of the panel to the middle portions of the sides of the panel owing to the compensation electrode segments and the compensation patterns, thereby increasing an effective active area of the panel and securing linearity of equipotential lines in the panel.

7 Claims, 5 Drawing Sheets

TOUCH PANEL STRUCTURE FOR INCREASING ACTIVE AREA

BACKGROUND OF THE INVENTION

1. Field of Invention

The present invention relates to a touch panel, and more particularly, to a touch panel structure in which an effective active area of a touch panel is increased, sufficient linearity of equipotential lines is secured, and a voltage gradient and a voltage drop phenomenon are compensated.

2. Description of the Prior Art

Generally, touch panels are apparatuses installed in display units of information and communication equipment so as to input a variety of data or cause systems such as electronic/electrical equipment to execute specific commands, by merely getting a touch thereto or drawing characters or pictures thereon using a finger, a pen or the like. Since such touch panels can be used in systems such as the information and communication equipment or electronic/electrical equipment without using an input device such as a keyboard or a mouse, there is an advantage in that use of spaces can be maximized.

There are various kinds of touch panels. In a case where axes of a touch panel are configured by using a single sheet, a predetermined coordinate system should be constructed to correspond to physical signals inputted by a user. To this end, electrical coordinate signals are expressed by a touch panel with a two-dimensional coordinate system, and the coordinate system uses X and Y coordinates.

In order to define the X and Y coordinate system in the touch panel in such a way, a resistive surface of the entire sheet is constructed by a conductive film sheet with a constant surface resistance value and electrode segments are made of a material with a relatively low resistance value in order to generate an electric field for constructing the X and Y coordinates. When the user physically touches the resistive surface of the touch panel, relevant electrode segments at the touched position generate X- and Y-axis signals and a controller connected with the touch panel recognizes an intersection of positions indicated by the X- and Y-axis signals and calculates X and Y coordinates of the relevant touched position.

FIG. 1 is a plan view showing an example of a conventional touch panel. A touch panel generally has a disadvantage in that since a voltage gradient or voltage drop occurs from positions where electrodes are installed, to middle positions of X and Y axes, an electric field is distorted and thus linearity is distorted. In order to compensate the voltage gradient or drop, a touch panel 10 shown in FIG. 1 has a configuration in which a series of "Z-shaped" electrode segments 12, 14 is curved inwardly from corners of the touch panel to middle positions of four sides of the touch panel and "T-shaped" electrode segments 16 are disposed just in the middle portions of the four sides to compensate the voltage drop. Further, electrode segments 18 are connected to each other at the corners of the touch panel 10. Although not shown in the figure, lead wires for supplying electric power are connected to the electrode segments 18 at the corners.

However, there is a problem in such a touch panel 10 in that the size of an active area of the touch panel 10 is decreased and linearity of equipotential lines is not easily secured with the configuration of the electrode segments curved inwardly. Further, there is a difficulty in fabricating the electrode segments of which the series is curved.

FIG. 2 is a plan view showing an example of another conventional touch panel. In a touch panel 40 shown in FIG. 2, electrode segments 42, 44 with irregular geometric shapes such as "I," "T," and "L" are arranged in rows along four sides of the touch panel but they are not connected to one another at corners of the touch panel 40.

However, even in such a touch panel 40, a potential distortion phenomenon occurs and there exist areas 46 where a voltage gradient or voltage drop occurs from positions where the electrode segments are installed, to middle positions of X- and Y-axes of the touch panel, due to the electrode segments 42, 44 with the irregular geometric shapes. Thus, the size of an active area 48 is decreased and there is a difficulty in securing linearity of equipotential lines, in the same way as the touch panel shown in FIG. 1. Further, since the geometric electrode segments 42, 44 shown in FIG. 2 should be fabricated through processes of deposition, etching and the like, there is a difficulty in fabricating them.

SUMMARY OF THE INVENTION

The present invention is conceived to solve the aforementioned problems. An object of the present invention is to provide a touch panel structure for increasing an active area of a touch panel, wherein electrode segments are linearly arranged in a predetermined length and at a constant interval and compensation patterns are provided to minimize a voltage gradient or a voltage drop phenomenon generated from corners of the touch panel to middle portions of sides of the touch panel, whereby an effective active area of the touch panel is increased, sufficient linearity of equipotential lines is secured, and it can be fabricated through a simpler process.

A touch panel structure for increasing an active area according to the present invention for achieving the object comprises a resistive surface for constructing an inner portion of the panel taking the shape of a rectangle with four sides and four corners; a plurality of electrode segments arranged in a predetermined length and at a constant interval in the resistive surface adjacent to the four sides of the panel to be symmetric with each other disposed at corresponding positions; a plurality of compensation electrode segments arranged in a predetermined length and at a constant interval between the plurality of electrode segments and the sides of the panel to be symmetric with each other disposed at corresponding positions; and compensation patterns formed through connection of the electrode segments disposed at any side of the panel with the compensation electrode segments adjacent thereto.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
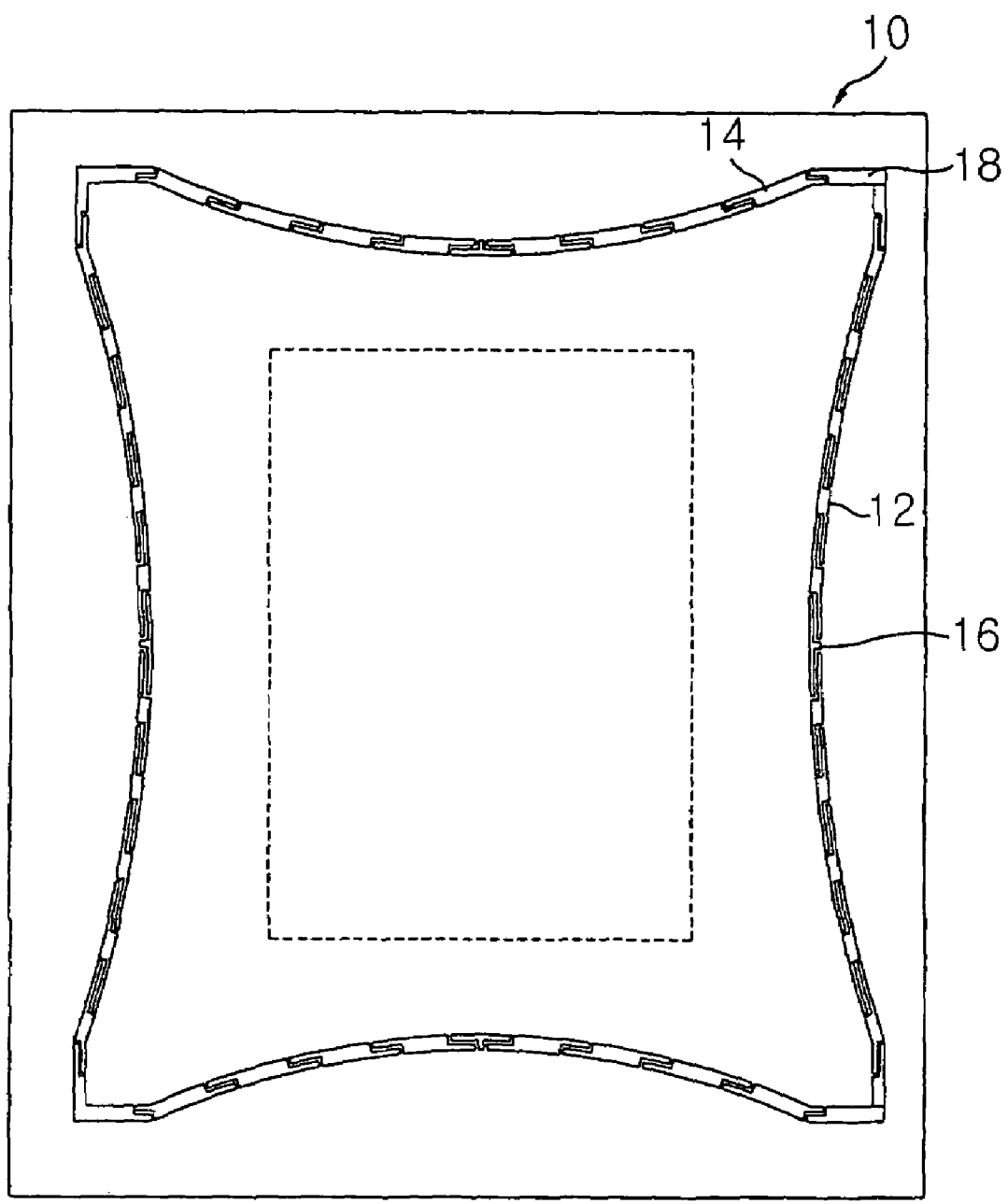
FIG. 1 is a plan view showing an example of a conventional touch panel.
Figure 2:
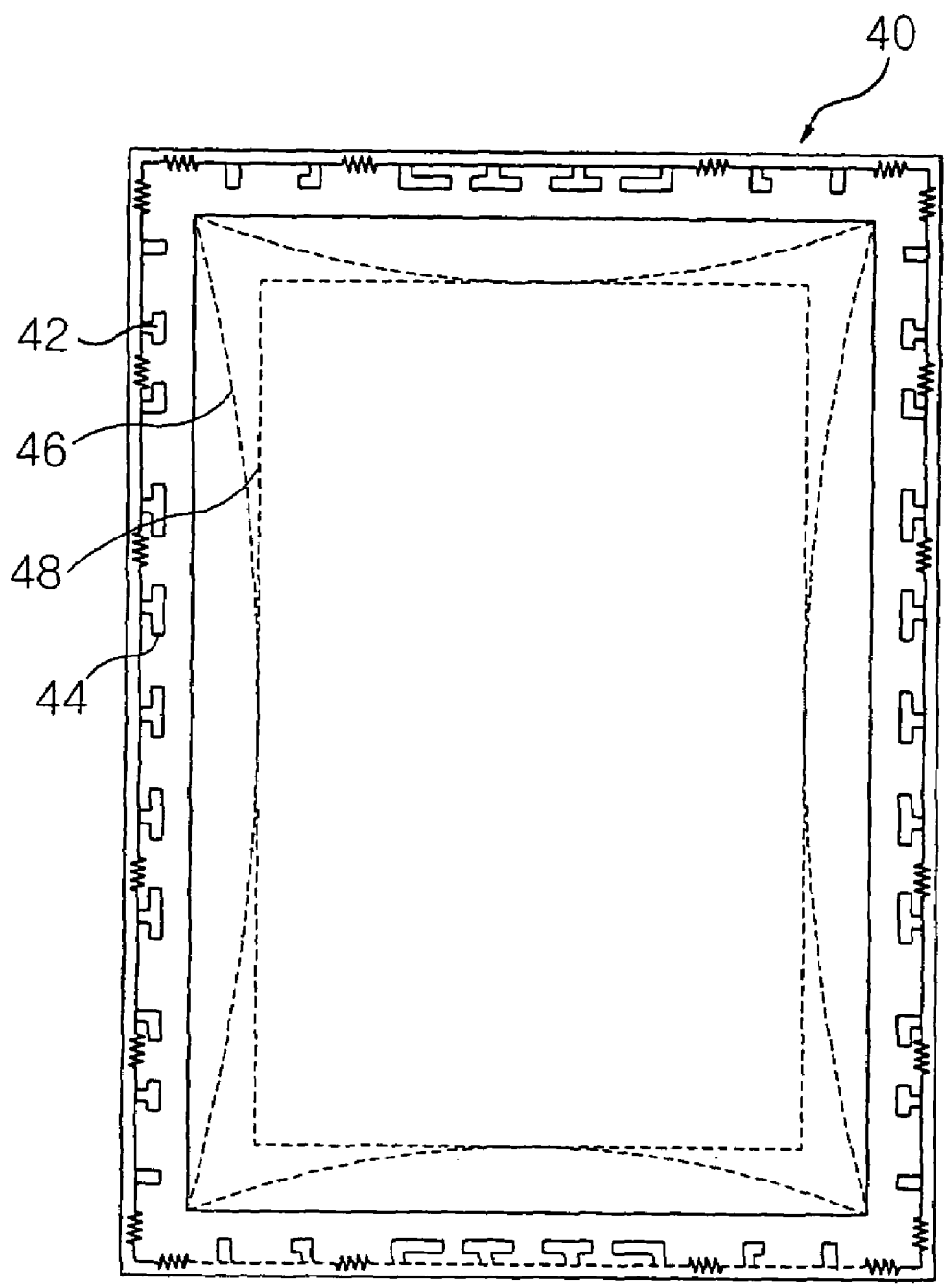
FIG. 2 is a plan view showing an example of another conventional touch panel.
Figure 3:
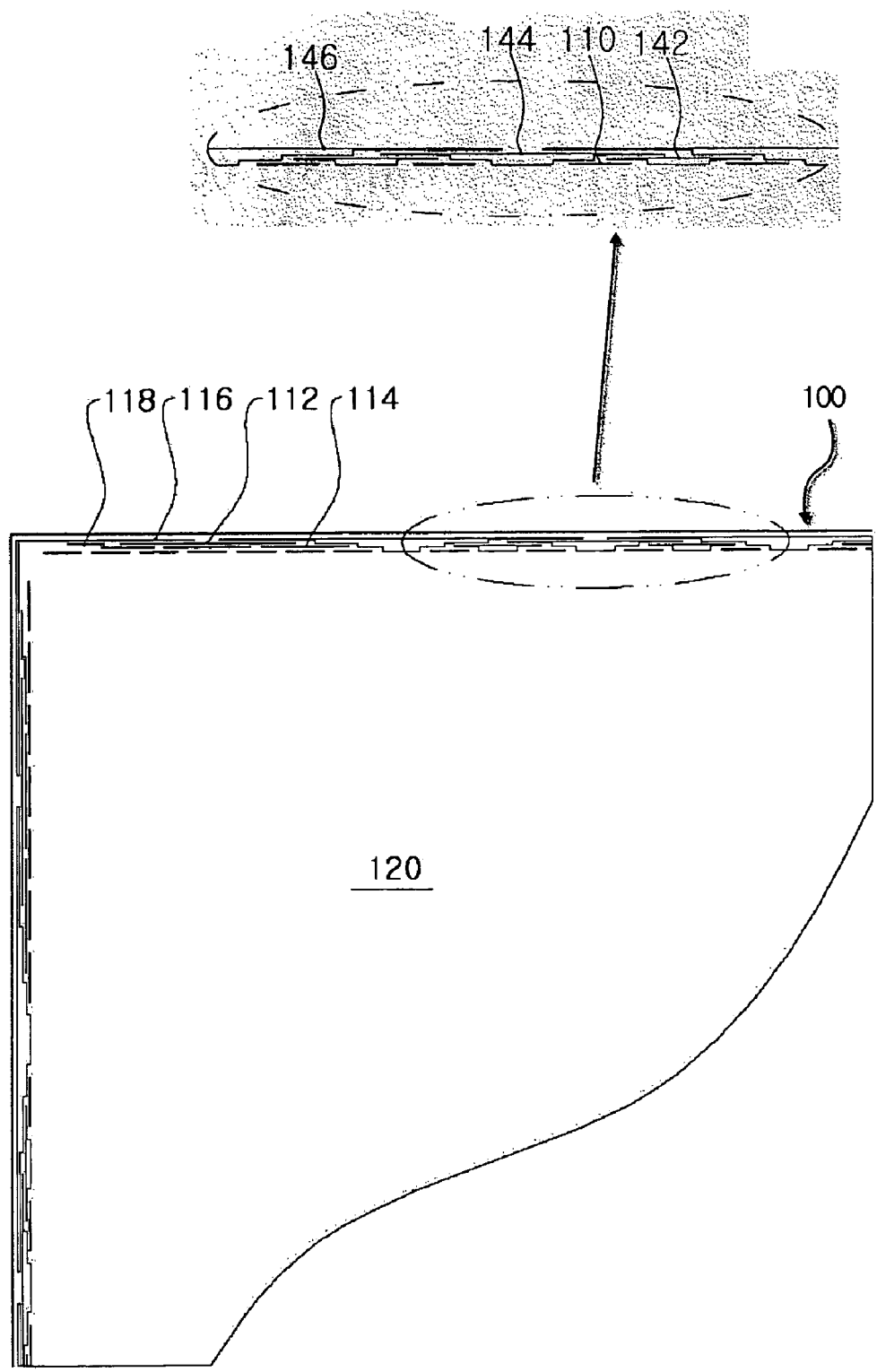
FIG. 3 is a schematic plan view and partial detailed view showing a touch panel structure for increasing an active area of a touch panel and compensating a voltage drop phenomenon generated at middle portions of sides of the touch panel, according to an embodiment of the present invention.

FIG. 3 is a schematic plan view and partial detailed view showing a touch panel structure capable of increasing an active area of a touch panel and compensating a voltage drop phenomenon generated at middle portions of sides of the touch panel, according to an embodiment of the present invention.

Figure 4A:
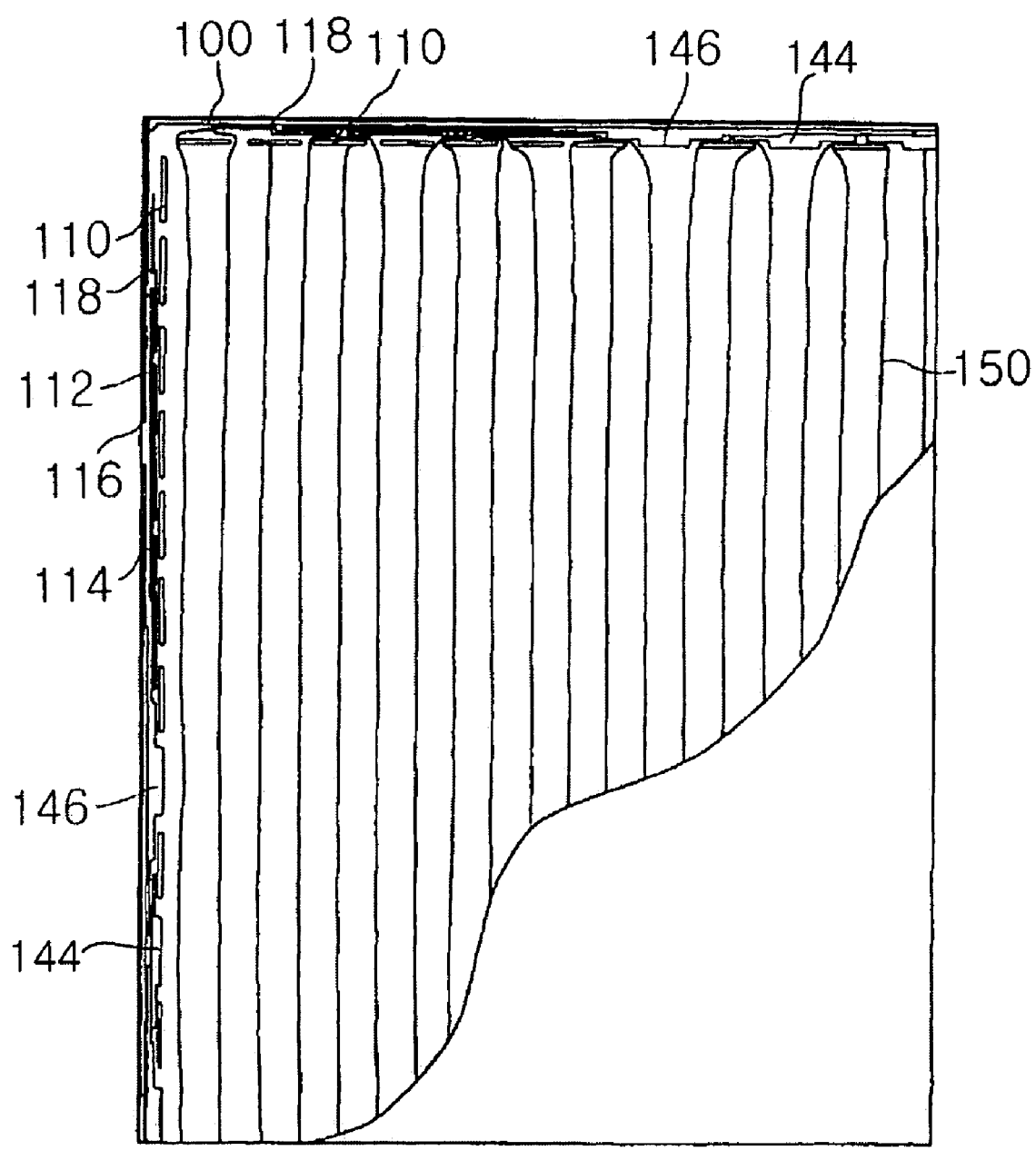
FIGS. 4a and 4b are views showing equipotential lines formed in the touch panel of the present invention when the touch panel is operated.

Referring to FIGS. 3 and 4a, a touch panel 100 of the present invention comprises a resistive surface 120 for constructing an inner portion of the rectangular panel with four sides and four corners; a plurality of electrode segments 110 arranged in a predetermined length and at a constant interval in the resistive surface 120 adjacent to the four sides of the panel to be symmetric with each other disposed at corresponding positions; a plurality of compensation electrode segments 112, 114 and 116 arranged in a predetermined length and at a constant interval between the plurality of electrode segments 110 and the sides of the panel to be symmetric with each other disposed at corresponding positions; and compensation patterns 142, 144 and 146 formed through connection of the electrode segments 110 disposed at any side of the panel with the compensation electrode segments 112, 114 and 116 adjacent thereto. The touch panel 100 of the present invention may further comprise "Z-shaped" edge electrodes 118 arranged in the resistive surface 120 at both ends of each of the four sides of the panel with the four corners of the panel interposed therebetween. At this time, the respective electrode segments 110 arranged at both sides of the panel along an X-axis should be symmetric with each other, and it is also true for the respective electrode segments 110 arranged at both sides of the panel along a Y-axis. Preferably, the edge electrodes 118 are arranged between the plurality of electrode segments 110 and the sides of the panel.

The touch panel 100 of the present invention can increase the size of an active area 120 of the panel and secure linearity of equipotential lines by linearly arranging the electrode segments 110 along edges of the four sides of the panel. Linearity of an electric field uniformly distributed in the active area can be secured by uniformly dividing an electric current through the electrode segments 110 arranged in the predetermined length and at the constant interval along the X- and Y-axes so that the electric field can exhibit a constant linear output response in the active area.

However, the linearity of the equipotential lines may be distorted since the voltage gradient or voltage drop phenomenon is generated as the distance between the electrode segments 110 and portions of the panel to which a voltage is applied is increased. The voltage gradient or voltage drop is severe in the middle portions of the sides of the panel as compared with the corners of the panel, and is pointed out as a cause to generate the electric field distortion phenomenon that distorts the correct linear output response of the panel.

In order to prevent such a voltage gradient or voltage drop, at least one of the plurality of compensation electrode segments 112, 114 and 116 is installed in the predetermined linear length and at the constant interval between the electrode segments 110 and the sides of the panel. In the embodiment shown in FIG. 3, the compensation electrode segments 112, 114 and 116 are constructed in three lines. The number of compensation electrode segments may be changed by those skilled in the art. Therefore, according to the touch panel of the present invention, the voltage gradient or voltage drop generated during the division of the electric current at the upper electrode segments 110 can be compensated by the lower compensation electrode segments 112, 114 and 116 staggered with respect to the upper electrode segments 110.

Further, the present invention can employ the compensation patterns 142, 144 and 146 in the form of connections between the electrode segments 110 placed in the middle portions of the four sides of the touch panel and the lower compensation electrode segments 112, 114 and 116 adjacent thereto in order to the prevent the voltage gradient or voltage drop phenomenon. At this time, the compensation patterns 142 are in the form of connections between the upper electrode segments 110 and the first compensation electrode segments 112 just therebelow, and the compensation patterns 144 are in the form of connections between the upper electrode segments 110 and the first and second compensation electrode segments 112, 114 therebelow, and the compensation patterns 146 are in the form of connections between the upper electrode segments 110 and the first to third compensation electrode segments 112, 114 and 116 therebelow. Thus, the compensation patterns 142, 144 and 146 are configured such that they are widened from the resistive surface 120 toward the sides of the panel. For example, the compensation patterns 142 take the shape of, "⊥."

The compensation patterns 142, 144 and 146 of the touch panel may also be arranged at any portions where the voltage gradient or voltage drop occurs, in addition to the middle portions of the four sides of the panel.

Accordingly, the touch panel of the present invention can prevent the electric field distortion phenomenon due to the distortion of the linear output response, secure the linearity of the equipotential lines, and increase the size of the active area of the panel, by avoiding the voltage gradient or voltage drop using the compensation patterns 142, 144 and 146.

Meanwhile, the compensation patterns 142, 144 and 146 as well as the electrode segments 110, the compensation electrode segments 112, 114 and 116, and the "Z-shaped" edge electrodes 118 are formed through a printing process for metals or metal compounds without using processes such as deposition, etching and the like. Thus, the etching process can be eliminated, so that time required for processes of fabricating them can be reduced and procedures of the processes can be simplified.

Figure 4B:
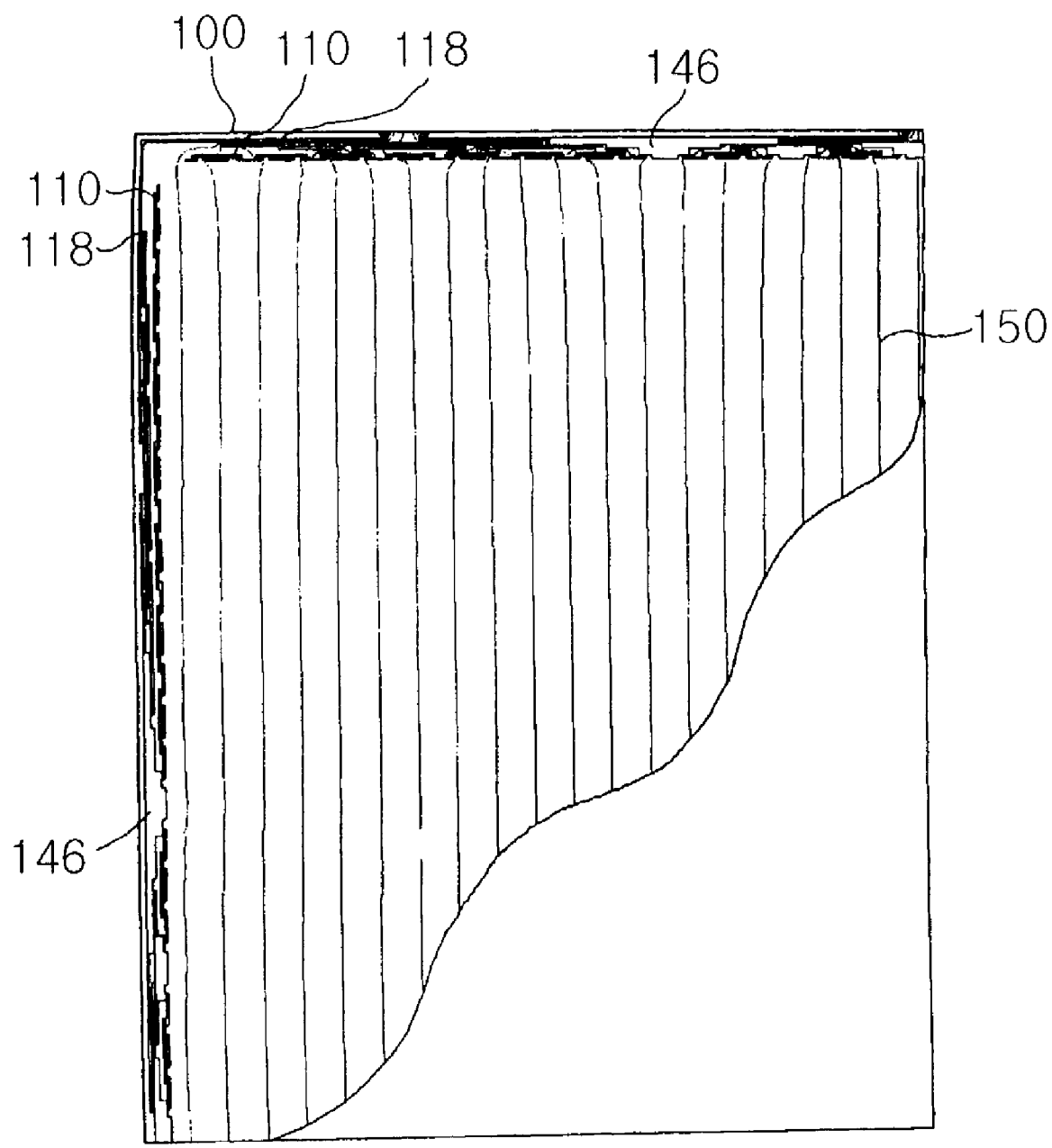

FIGS. 4a and 4b are views showing the equipotential lines generated in the touch panel of the present invention when the touch panel is operated. Referring to these figures, it can be seen that equipotential lines parallel to the Y-axis of the panel are generated. Therefore, it is possible to minimize the distortion phenomenon of the linear output response due to the voltage drop phenomenon generated in the middle portions of the sides of the panel as the distance from the portions to which the voltage is applied is increased. Consequently, the touch panel of the present invention can provide the linear output response with the linearity of the equipotential lines since the size of the effective active area is increased, and compensation patterns 142, 144 and 146 for compensating the voltage drop phenomenon or voltage gradient generated in the middle portions of the sides of the panel are additionally employed.

As described above, according to the touch panel of the present invention, the electrode segments are linearly arranged in the predetermined length and at the constant interval and the compensation patterns in the form of the connections between the electrode segments and the compensation electrode segments adjacent thereto are additionally provided in the middle portions of the sides of the panel. Thus, it is possible to minimize the voltage gradient or voltage drop generated from the corners of the panel to the middle portions of the sides of the panel, thereby increasing the effective active area of the panel and securing the linearity of the equipotential lines. Accordingly, even in case of a large touch panel, the present invention can provide sufficient linear output response in the active area owing to the minimization of the voltage gradient or voltage drop in the panel.

Further, contrary to the conventional touch panel in which electrodes are fabricated through processes such as deposition, etching, printing and the like, the present invention employs the printing process for metals or metal compounds. Thus, the etching process can be eliminated.

Meanwhile, it should be understood that the present invention is not limited to the aforementioned embodiment, and those skilled in the art can make various modifications and changes without departing from the technical spirit and scope of the invention defined by the appended claims.

What is claimed is:

1. A touch panel structure for increasing an active area of a touch panel, comprising:

a resistive surface for constructing an inner portion of the panel taking the shape of a rectangle with four sides and four corners;

a plurality of electrode segments arranged in a predetermined length and at a constant interval in the resistive surface adjacent to the four sides of the panel to be symmetric with each other disposed at corresponding positions;

a plurality of compensation electrode segments, including first compensation electrode segments and second compensation electrode segments, arranged in a predetermined length and at a constant interval between the plurality of electrode segments and the sides of the panel to be symmetric with each other disposed at corresponding positions, said first and second said compensation electrode segments being arranged in different lines; and compensation patterns formed through connection of the electrode segments disposed at any side of the panel with the compensation electrode segments adjacent thereto, wherein first said compensation patterns connect said eletrode segments with said first compensation electrode segments, and second said compensation patterns connect said electrode segments with said first compensation segments and said second compensation electrode segments.

2. The touch panel structure as claimed in claim 1, further comprising "Z-shaped" edge electrodes arranged in the resistive surface at both ends of each of the four sides of the panel with the four corners of the panel interposed therebetween.

3. The touch panel structure as claimed in claim 2, wherein the edge electrodes are arranged between the plurality of electrode segments and the sides of the panel.

4. The touch panel structure as claimed in claim 2 or 3, wherein the electrode segments, the compensation electrode segments, the compensation patterns and the edge electrodes are formed through a printing process for metals or metal compounds.

5. The touch panel structure as claimed in claim 1, wherein the compensation patterns are arranged in middle portions of the four sides of the panel, or at portions where a voltage gradient or voltage drop occurs.

6. The touch panel structure as claimed in claim 1, wherein the compensation patterns are widened from the resistive surface toward the sides of the panel.

7. The touch panel structure as claimed in claim 1, further comprising third electrode compensation segments arranged in a third line, and third compensation patterns connecting said electrode segments with said first electrode compensation segments, said second electrode compensation segments, and said third electrode compensation segments.

* * * * *